United States Patent

[11] 3,561,481

| [72] | Inventor | John F. Taplin<br>15 Sewall St., West Newton, Mass. 02165 |
|---|---|---|
| [21] | Appl. No. | 816,228 |
| [22] | Filed | Apr. 15, 1969<br>Division of Ser. No. 597,192, Nov. 7, 1966, abandoned. |
| [45] | Patented | Feb. 9, 1971 |

[54] FAIL-SAFE SERVO-CONTROLLED MIXING VALVE
3 Claims, 4 Drawing Figs.

[52] U.S. Cl. .................................................. 137/625.4, 251/282; 236/12
[51] Int. Cl. ........................................................ F16k 11/07, F16k 31/165, F16k 19/00
[50] Field of Search ........................................... 137/90, 505.18, 625.4, 625.34, 625.35; 251/25, 30, 43—46; 236/12

[56] References Cited
UNITED STATES PATENTS

| 824,658 | 6/1906 | Junggren | 251/30 |
|---|---|---|---|
| 1,302,538 | 5/1919 | Gulick | 137/413 |
| 2,449,766 | 9/1948 | Brown | 236/12 |
| 3,087,675 | 4/1963 | Honegger | 251/282X |

FOREIGN PATENTS

| 818,042 | 6/1937 | France | 236/12 |

*Primary Examiner*—Henry T. Klinksiek
*Attorney*—Erwin Salzer

ABSTRACT: A fail-safe servo-controlled mixing valve is provided with a spring means to render it fail-safe, and with another or auxiliary fluid-pressure-operated means to render it fail-safe should the fail-safe spring means fail to properly function.

PATENTED FEB 9 1971 3,561,481

INVENTOR:
JOHN F. TAPLIN,
BY [signature]
ATTORNEY 3,561,481

FAIL-SAFE SERVO-CONTROLLED MIXING VALVE

This is a division of my copending Pat. application Ser. No. 597,192, now abandoned filed Nov. 7, 1966 for Fail-Safe Servo-Controlled Mixing Valve.

BACKGROUND OF INVENTION

This invention relates generally to servo-controlled mixing valves for mixing two fluids in accordance with a variable ratio determined by the action of a sensing element and more particularly to mixing valves of the above description operated by a servomotor supplied with and operated by the pressure of one of the two fluids to be mixed.

The proper operation of such mixing valves depends on the presence of a predetermined minimum pressure of the particular fluid, or first fluid, of the two fluids to be mixed which is supplied to, and provides the motive power for, the servomotor. If the pressure of this fluid drops below the aforementioned predetermined minimum value, or to virtually zero, the control of the sensing element is no longer effective. The sensing element may require a relative decrease in the mixture of the two fluids of the second fluid, i.e. the fluid not supplied to, and not intended to provide the motive power for, the servomotor, but in the absence of a predetermined minimum pressure of the first fluid energizing the servomotor the latter is incapable of performing the function called for by the condition of the sensing element.

To better illustrate the situation, let us assume that the first fluid, i.e. the fluid supplied to and energizing the servomotor, is relatively cold, and that the second fluid to be mixed with the first fluid is relatively hot, and that the sensing element is a thermostat controlling the servo valve of the servomotor and hence the mixing-valve-operating servomotor in such a fashion as to maintain a substantially constant temperature of the mixture of the first fluid and the second fluid. If the pressure of the first relatively cold fluid drops below a predetermined minimum value, or to virtually zero, the servomotor does not respond any longer to the control of the thermostat, and the temperature of the fluid mixture to be made may rise to a dangerous level which may be as high as the temperature of the second relatively hot fluid.

This invention relates to servo-controlled fluid mixing valves wherein a pressure failure of one of the two fluids to be mixed precludes in the mixture of the two fluids a preponderance of the other of the two fluids, incompatible with the control which the sensing element tends to exert upon the servo-valve provided for controlling the mixing-valve-operating servomotor.

As mentioned above, one of the reasons which may preclude the mixing-valve-operating servomotor from performing its proper function is a pressure failure of one of the two fluids to be mixed. Another failure condition which may arise and may result in a danger condition is a failure of the servomotor as such. The servomotor may, for instance, be a rolling diaphragm device and become inoperative if the rolling diaphragm thereof develops a leak. The servomotor may be formed by metal bellows which may likewise develop a leak and thus become inoperative. The servomotor for operating the mixing valve may be a piston-and-cylinder type fluid motor including an annular fluid seal, such as an O-ring, between the lateral walls of the cylinder and the lateral wall of the piston. Such an annular fluid seal is also subject to failure, i.e. it may allow leakage of fluid from one side of the seal to the other. This type of failures results in a more or less complete equalization of the pressure to both sides of the movable, mixing-valve-operating partition of the servo fluid motor. Under such conditions the servomotor does not respond any longer to the command given to it by the servo-valve by which it is normally controlled, and does not respond to the control exerted by the sensing element upon the servo-valve.

Assuming that the first fluid to be supplied to the servomotor to energize the same and to supply its motive power is normally relatively cold, and that the second fluid to be admixed to the first fluid is normally relatively hot, and that the sensing element controlling the servo-valve of the servomotor and hence the mixing-valve-operating servomotor is a thermostat whose control function is to maintain a constant temperature of the mixture of the two fluids; if the servomotor fails to obey the control function of the thermostat, the temperature of the fluid mixture may rise to a dangerous level.

This invention relates to servo-controlled fluid mixing valves wherein a failure of the servomotor, such as a leakage condition, precludes in the mixture of the two fluids to be mixed a preponderance of one of them to an extent incompatible with the control the sensing element tends to exert.

It would seem that if the stem of a mixing valve of the above description is spring-biased to move one of its valve elements — such as the valve element controlling the admission of hot water — to its closed position on occurrence of a failure of the servomotor to respond to the control the sensing element tends to exert, such a mixing valve might be considered to be fail-safe. This is, however, actually not the case because springs are critical components subject to failure. Hence an actually fail-safe mixing valve cannot rely on spring action only.

SUMMARY OF INVENTION

Mixing valves according to this invention include means defining a first passageway for a first fluid, means defining a second passageway for a second fluid, and means defining a mixing chamber for mixing said first fluid and said second fluid. A first valve means controls the admission of the first fluid from the first passageway to the mixing chamber. The first valve means includes a valve element increasing the admission of the first fluid to the mixing chamber when moved in one direction, and decreasing the admission of the first fluid to the mixing chamber when moved in the opposite direction. The valve element of the first valve means has a predetermined effective area acted upon by said first fluid and being biased by the action of said first fluid thereon in said one direction. A second valve means controls the admission of the second fluid from the second passageway to the mixing chamber. This second valve means includes a valve element decreasing the admission of the second fluid to the mixing chamber when moved in said one direction, and increasing the admission of the second fluid to the mixing chamber when moved in said opposite direction. The valve element of the second valve means has a predetermined effective area acted upon by the second fluid and being biased by the fluid action thereon in said opposite direction. A common fluid servomotor operates a common valve stem for jointly operating the valve element of the first valve means and the valve element of the second valve means in the same direction. The fluid servomotor includes a partition means having a considerably larger effective area than the effective area of the valve element of the first valve means. One side of the partition is directly arranged in the first passageway and exposed to the full pressure of the first fluid therein. Duct means supply fluid derived from the first passageway to the other side of the partition means to energize the servomotor. A servo-valve having a valve element positioned in response to an operating condition controls the pressure of fluid on the aforementioned other side of the partition means of the fluid servomotor. A spring means acts upon the aforementioned valve stem and biases the same in said one direction to cause closing of said second valve means in response to a predetermined decrease in pressure of said first fluid. To take care of the contingency of failure of said spring means a valve balancing and biasing means integral with the valve stem is acted upon by said second fluid in said one direction. The valve balancing and biasing means has a larger effective area than the effective area of the valve element of the second valve means. Consequently the pressure of the second fluid upon the valve element of the second valve means is not only balanced but overbalanced. In other words, a bias of the valve stem in said one direction is established in addition to the bias established by the aforementioned spring means. This additional bias is due to the excess of pressure of the second fluid on the valve balancing and biasing means above the pressure of said second fluid upon the valve element of the second valve means.

DESCRIPTION OF PREFERRED EMBODIMENTS OF INVENTION

Figure 1:
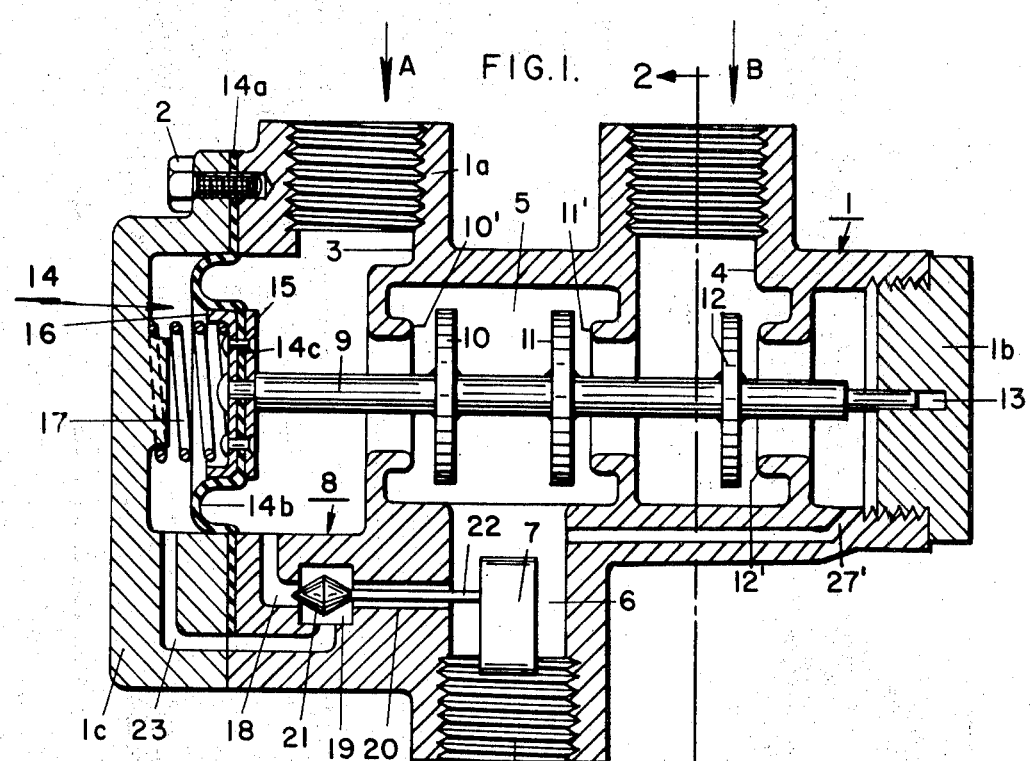
FIG. 1 is a longitudinal section of a servo-controlled mixing valve showing the general layout of such a valve.
Figure 2:
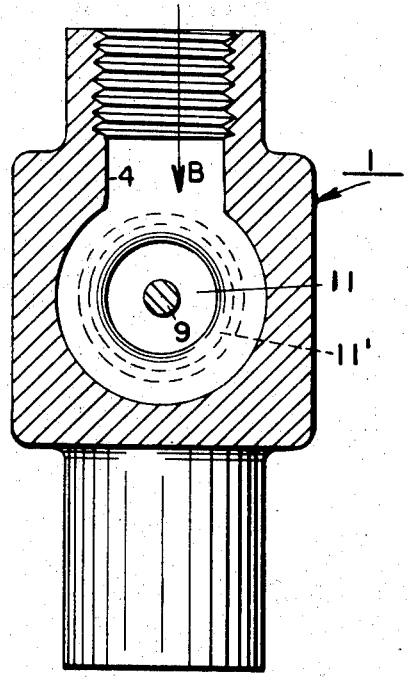
FIG. 2 is a section along 2–2 of FIG. 1.

In FIGS. 1 and 2 numeral 1 has been applied to generally indicate a passageway-defining structure. This structure is made up of three parts, i.e. the center portion 1a, the plug 1b and cylinder portion 1c. Plug 1b is externally screw threaded and its screw threads engage internal screw threads shown in FIG. 1 in the right end of center portion 1a. Cylinder portion or cap 1c is secured to center portion 1a by means of a plurality of screws 2 of which but one is shown in FIG. 1. Center portion 1a defines a first duct or passageway 3 for admission of a first fluid indicated by arrow A, and further defines a second duct or passageway 4 for admission of a second fluid indicated by arrow B. Numeral 5 has been applied to indicate a mixing chamber for fluids A and B likewise defined by center portion 1a. Center portion 1a further defines an outlet passageway 6 for the mixture of fluids A and B. Arrow C indicates the flow of the fluid mixture leaving mixing chamber 5. Sensing element 7, e.g. a bimetallic thermostat, or Bourdon tube, is arranged inside of passageway 6 and controls a servo-valve generally indicated by reference character 8. Stem 9 supports three poppet valve elements 10, 11, 12. Valve element 10 cooperates with valve seat 10', valve element 11 cooperates with valve seat 11' and valve element 12 cooperates with valve seat 12' to define gaps of varying width, depending upon the position of valve stem 9. The right end of stem 9, as seen in FIG. 1, is reduced in diameter, and movably supported in a slide-bearing-forming bore 13 provided in plug 1b.

Numeral 14 has been applied to generally indicate a rolling diaphragm type servomotor for operating stem 9 and poppet valve means 10, 11, 12. Reference character 14a has been applied to indicate the radially outer clamping flange of the rolling diaphragm clamped between parts 1a and 1c, reference numeral 14b has been applied to indicate the substantially U-shaped rolling wall of the rolling diaphragm, and reference numeral 14c has been applied to indicate the radially inner clamping flange of the rolling diaphragm. The latter is sandwiched between a pair of stiff or rigid plates 15, 16, which may be held in place by appropriate fasteners, e.g. rivets. The left end of valve stem 9, as seen in FIG. 1, is firmly affixed to the sandwich structure 14c, 15, 16. Helical spring 17 rests with one end thereof against sandwich structure 14c, 15, 16 and with the other end thereof against the inner surface of part 1c. As a result, valve stem 9 and poppet valve elements 10, 11, 12 are spring biased from left to right, as seen in FIG. 1.

Center portion 1a further defines fluid passageway 18, servo-valve chamber 19 and fluid passageway 20. Servo-valve chamber 19 houses servo-valve element 21 which is in the shape of a double cone. The end of passageway 18 adjacent the left portion of double cone 21 forms a valve seat for controlling jointly with the left portion of double cone 21 the admission of fluid A from passageway 3 to servo-valve chamber 19. The right portion of double cone-shaped servo-valve element 21 cooperates with the left end of passageway 20 to form a gap of varying size for releasing fluid under pressure from servo-valve chamber 19 into passageway 6, the latter being a zone of relatively low pressure. Valve element 21 is supported by a valve stem 22 arranged in fluid passageway 20 and operable in directions longitudinally thereof by sensing element or thermostat 7. Passageway 23 interconnects servo-valve chamber 19 and the cylindrical space situated to the left of rolling diaphragm 14a, 14b, 14c, as seen in FIG. 1. One portion of passageway 23 is defined by part 1a, and another portion of passageway 23 is defined by part 1c.

Valve element 10 and valve seat 10' form a first valve means for the controlled admission of fluid A from passageway 3 to mixing chamber 5. Valve element 11 and valve seat 11' form a second valve means for the controlled admission of fluid B from passageway 4 to mixing chamber 5. Components 12, 12' are valve-balancing means. If the diameters of poppet valve elements 11, 12 and the diameters of valve seats 11', 12' are equal, the forces of fluid B on poppet valve elements 11, 12 are opposite and equal. In other words, the valve element 11 for admission of fluid from passageway 4 to mixing chamber 5 is balanced. Valve element 10 is not balanced since the effective area of partition 14, 15 by far exceeds the effective area of the valve element 10 of valve means 10, 10'.

Valve means 10, 10' increase the admission of fluid A from passageway 3 to chamber 5 when valve element 10 is moved from left to right, as seen in FIG. 1, and decreases the admission of fluid A from passageway 3 to chamber 5 when valve element 10 is moved from right to left. The action of valve means 11, 11' is opposite to that of valve means 10, 10' in the sense that when valve element 11 is moved from left to right, as seen in FIG. 1, the admission of fluid B from passageway 4 to mixing chamber 5 is decreased.

Valve elements 10, 11 remain in any given position when the sum total of all the forces acting on stem 9 in a direction longitudinally thereof is zero.

Assuming fluid A to be relatively cold, and fluid B relatively hot, and assuming that sensing element 7 is a thermostat whose function it is to maintain the temperature of mixture C of fluids A and B substantially constant.

If the temperature of mixture C in passageway 6 drops below a predetermined temperature, thermostat 7 moves stem 22 of servo-valve element 21 from right to left, as seen in FIG. 1. As a result, the effective area of passageway 18 is decreased and the effective area of passageway 20 increased. This, in turn, results in an increase of the ratio of fluid pressure on the right side of rolling diaphragm 14a, 14b, 14c to the fluid pressure on the left side of rolling diaphragm 14a, 14b, 14c. Hence stem 9 is moved from right to left, as seen in FIG. 1, until a new equilibrium position has been established wherein the ratio of relatively hot fluid B to relatively cold fluid A is larger than before the above change.

The reverse action occurs if the mixture C of fluids A and B increases above a predetermined temperature. Then thermostat 7 moves stem 22 of servo-valve element 21 from left to right, as seen in FIG. 1. As a result, the effective area of passageway 18 is increased, and the effective area of passageway 20 decreased. This, in turn, results in a decrease of the ratio of the fluid pressure on the right side of rolling diaphragm 14a, 14b, 14c to the fluid pressure on the left side of rolling diaphragms 14a, 14b, 14c. Consequently stem 9 is moved by sandwich structure 14c, 15, 16 from left to right until a new equilibrium condition is established wherein the ratio of relatively hot fluid B to relatively cold fluid A is smaller than before the above change.

It is apparent from the foregoing that the mixing valve operates as a negative feedback loop tending to maintain a constant output condition under varying input conditions.

Assuming now that the pressure of fluid A drops below a predetermined minimum value, or to zero. This causes malfunction of servomotor 14, or renders servomotor 14 entirely inoperative. Under such conditions thermostat 7 may actuate the servo-valve 8, or the servo-valve element 21 thereof in the desired sense, but the servomotor 14 is not capable of performing the function that is required to perform. This may result in dangerous excess temperatures of the fluid mixture C in chamber 5 and passageway 6. This potential danger is eliminated in the structure shown in FIG. 1 by the presence of biasing spring 17. If the pressure of fluid A decreases below a predetermined minimum value, biasing spring 17 tends to reduce the supply of fluid B and to increase the supply of fluid A. Assuming that the pressure of fluid A drops to virtually zero, this causes spring 17 to move stem 9 and poppet valve element 11 to the right limit position thereof, thus completely cutting off the supply of fluid B from chamber 5.

Assuming now that the pressure of fluid A does not drop below a predetermined critical minimum value, but that a leak develops in the rolling wall 14b of rolling diaphragm 14a, 14b, 14c, resulting in equalization of the pressure prevailing to both sides of the rolling diaphragm 14a, 14b, 14c. Such a failure of the servomotor 14 may result in hazardous conditions such as, for instance, the release of a fluid mixture from passageway 6 whose temperature is dangerously high. This danger is avoided in the structure of FIG. 1 by the presence of biasing spring 17 which moves stem 9 and poppet valve elements 10, 11 to the right limit position thereof, or to the fully closed positions of valve elements 11, 12 when the pressure to both sides of rolling diaphragm 14a, 1b, 14c is equalized, thus completely cutting off the supply of fluid B from mixing chamber 5 and outlet passageway 6. Spring 17 is, however, a critical component, i.e. such springs fail from time to time and in view thereof the structure of FIG. 1 is not entirely fail-safe.

Figure 3:
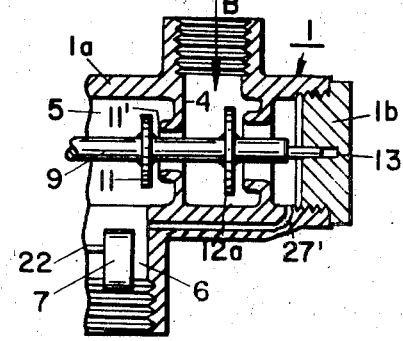
FIG. 3 shows a modification of the right portion of the structure of FIG. 1 in the same fashion as FIG. 1 and refers to a first embodiment of the invention.
Figure 4:
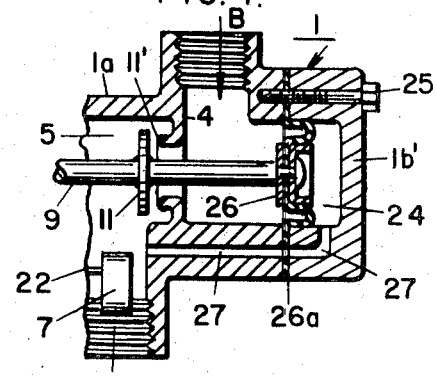
FIG. 4 shows another modification of the right portion of the structure of FIG. 1 in the same fashion as FIG. 1 and refers to a second embodiment of the invention.

In FIGS. 3 and 4 the same reference characters as in FIG. 1 have been applied to indicate like parts. The modifications of FIGS. 1 and 2 shown in FIGS. 3 and 4 render the mixing valve entirely fail-safe.

In FIG. 3 the passageway defining structure 1 includes the central portion 1a and the plug 1b. Fluid B may be admitted through passageway 4 to mixing chamber 5. The valve structure for achieving this end in an unbalanced valve structure including two poppet valve elements 11, 12a mounted on stem 9 and each cooperating with a juxtaposed valve seat. The area of poppet valve element 12a exposed to the pressure of fluid B is much larger than the area of poppet valve element 11 exposed to the pressure of fluid B. As a result, stem 9 is biased from left to right, as seen in FIG. 3, by the excess of pressure of fluid B on valve element 12a above the pressure exerted by fluid B on valve element 11. This causes stem 9 and poppet valve element 11 to move from left to right in response to any critical drop of the pressure of the fluid A to be mixed in chamber 5 with fluid B, or in response to any failure of the fluid servomotor intended to operate the mixing valve or its stem 9, respectively. This fail-safe action does not depend upon the condition of spring 17.

The structures in FIGS. 1 and 3 define spaces situated to the left of plugs 1b. When the valve element 12 or 12a moves toward the left and away from its corresponding seat 12', there will be a flow of fluid or gas from left to right through this valve opening. In order to prevent a pressure buildup on the right-hand side of the valve element 12 or 12a a conduit designated as 27' provides for the flow of this fluid or gas into the outlet conduit 6.

Referring now to FIG. 4 the passageway-defining structure 1 includes the center portion 1a defining passageway 4 for the admission of fluid B to mixing chamber 5. The flow of fluid B from passageway 4 to mixing chamber 5 is controlled by a poppet valve including the movable valve element 11 and its cooperating fixed valve seat 11'. The former is mounted on stem 9 which is operated by the servomotor 14 shown in FIG. 1. The right side of passageway-defining structure 1 is closed by a cap 1b' defining a cylindrical space 24. Cap 1b' is screwed against center portion 1a by a plurality of screws 25 of which but one is shown in FIG. 4. A rolling diaphragm sealing device separates passageway 4 from space 24 defined by cap 1b'. The effective pressure area of rolling diaphragm sealing device 26 is considerably larger than the effective pressure area of valve means 11, 11'. Hence the pressure of fluid B in passageway 4 causes poppet valve 11 to close itself in case of a significant, or critical, loss of the pressure of fluid A admitted to mixing chamber 5, or in case of loss of the servomotor seal, in which case the pressures to both sides of the partition, or pressure barrier, of the servomotor are equalized, as explained above in considerable detail. It will be apparent that this fail-safe action does not depend upon the condition of spring 17.

Space 24 communicates by means of duct 27 with the passageway 6 into which mixing chamber 5 is drained and which is a region of relatively low pressure. The rolling diaphragm sealing device 26 includes a rolling diaphragm having a radially outer clamping flange 26a which is perforated at one point coextensive with a cross section of passageway 27.

It will be apparent from the foregoing that cap 1b' and rolling diaphragm-sealing device 26 are, in effect, an auxiliary fluid motor which is operated or energized by fluid B and which renders the mixing valve fail-safe, i.e. causes poppet valve means 11, 11' to close in case the servomotor 14 and its spring 17 shown to the left of FIG. 1 should fail and the pressure of fluid A admitted to passageway 3 shown to the left of FIG. 1 become critically low.

In all of the embodiments of the invention described and illustrated, the first valve means including movable valve element 10 and fixed valve seat 10' is an unbalanced valve, or nonforced balanced valve. Valve means 10, 10' has a predetermined effective area determining the force of fluid A upon valve element 10. The effective area of the partition means of fluid servomotor 14, i.e. the effective area of the rolling wall 14b of rolling diaphragm 14a, 14b, 14c plus the effective area of plate 15 or 16, respectively, is considerably larger that the effective area of valve seat 10'. This makes it readily possible for servomotor 14 to overcome the pressure of fluid A upon the nonforce balanced first valve means 10, 10' which is always directed from left to right, as seen in FIG. 1.

The parts 12a and 26 of FIGS. 3 and 4, respectively, are valve balancing and biasing means. Part 12a overbalances the pressure on valve element 11 and biases stem 9 slightly from left to right, as seen in FIG. 3. Part 26 of FIG. 4 overbalances the pressure on valve element 11 and biases stem 9 slightly from left to right, as seen in FIG. 4.

I claim:

1. A fail-safe servo-controlled mixing valve for mixing two fluids in accordance with a variable ratio determined by the action of a sensing element including:
   a. means defining a first passageway for a first fluid;
   b. means defining a second passageway for a second fluid;
   c. means defining a mixing chamber for mixing said first fluid and said second fluid;
   d. a first valve means for controlling the admission of said first fluid from said first passageway to said mixing chamber, said first valve means including a valve element increasing the admission of said first fluid to said mixing chamber when moved in one direction and decreasing the admission of said first fluid to said mixing chamber when moved in the opposite direction, said valve element of said first valve means having a predetermined effective area acted upon by said first fluid and being biased by the action of said first fluid thereon in said one direction;
   e. a second valve means controlling the admission of said second fluid from said second passageway to said mixing chamber, said second valve means including a valve element decreasing the admission of said second fluid to said mixing chamber when moved in said one direction and increasing the admission of said second fluid to said mixing chamber when moved in said opposite direction, said valve element of said second valve means having a predetermined effective area acted upon by said second fluid and being biased by the action of said second fluid thereon in said opposite direction;
   f. a common fluid servomotor operating a common valve stem for jointly operating said valve element of said first valve means and said valve element of said second valve means in the same directions, said fluid servomotor including a partition means having a considerably larger effective area than said effective area of said valve element of said first valve means, one side of said partition means being arranged directly in said first passageway and exposed to the full pressure of said first fluid therein;

g. fixed duct means communicating between said first passageway and the other side of said partition means of said servomotor for supplying fluid derived from said first passageway to the other side of said partition means of said servomotor to energize said servomotor;

h. a servo-valve arranged in said fixed duct means having a valve element positioned in response to an operating condition for controlling the pressure of fluid on said other side of said partition means;

i. spring means acting upon said valve stem and biasing said valve stem in said one direction to cause closing of said second valve means in response to a predetermined decrease of pressure of said first fluid; and j. a valve-balancing and biasing means fixedly secured to said valve stem acted upon by said second fluid in said one direction and having a larger effective area than said effective area of said valve element of said second valve means and establishing a bias of said valve stem in said one direction by an excess of the pressure of said second fluid upon said valve-balancing and biasing means above the pressure of said second fluid upon said valve element of said second valve means.

2. A fail-safe servo-controlled mixing valve as specified in claim 1 wherein said valve-balancing and biasing means includes a rolling diaphragm device having a larger effective area than said effective area of said valve element of said second valve means.

3. A fail-safe servo-controlled mixing valve as specified in claim 2 including duct means for venting to a low-pressure zone the space at the side of said rolling diaphragm device remote from said second passageway.